(12) United States Patent
Makida et al.

(10) Patent No.: US 7,178,064 B2
(45) Date of Patent: Feb. 13, 2007

(54) DEBUG DEVICE, DEBUG METHOD AND STORAGE MEDIUM

(75) Inventors: Hiroichi Makida, Tenri (JP); Mitsuhisa Ohnishi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 433 days.

(21) Appl. No.: 10/730,380

(22) Filed: Dec. 9, 2003

(65) Prior Publication Data

US 2004/0153803 A1 Aug. 5, 2004

(30) Foreign Application Priority Data

Dec. 9, 2002 (JP) .............................. 2002-356975

(51) Int. Cl.
*G06F 11/00* (2006.01)
(52) U.S. Cl. .................... 714/38; 717/124; 717/125
(58) Field of Classification Search ............... 714/38; 717/124, 125, 149
See application file for complete search history.

(56) References Cited

U.S. PATENT DOCUMENTS 5,687,375 A 11/1997 Schwiegelsohn
5,799,142 A * 8/1998 Toyoda ..................... 714/38
6,151,701 A 11/2000 Humphreys et al.
6,286,130 B1 9/2001 Poulsen et al.

FOREIGN PATENT DOCUMENTS

EP 0 406 602 A2 1/1991
JP 08-016429 1/1996

OTHER PUBLICATIONS

European Search Report mailed Jul. 18, 2005 in corresponding European application No. 03257737.1-PCT/.

* cited by examiner

*Primary Examiner*—Robert Beausoliel
*Assistant Examiner*—Yolanda L Wilson
(74) *Attorney, Agent, or Firm*—Nixon & Vanderhye, PC

(57) ABSTRACT

A debug device has a serialization section for converting a parallel program to a serial program and creating debug data indicating the corresponding relation between the parallel program and the serial program. The debug device further has a storage section for storing the debug data and a conversion section for mutually converting the corresponding data between the parallel program and the serial program based on the debug data in order for an operator to efficiently perform a debug operation.

20 Claims, 10 Drawing Sheets

```
10  int result1, result2, result3;
11  par {
12    {
13      int i, k, sum_k=0;
14      for (i=1;i<=10;i++) {
15        k=i*2;
16        sum_k=sum_k+k;
17      }
18      result1=sum_k;
19    }
20    {
21      int i, k, sum_k=0;
22      for (i=1;i<=10;i++) {
23        k=i*i;
24        sum_k=sum_k+k;
25      }
26      result2=sum_k;
27    }
28  }
29  result3=result1+result2;
```

Fig.5

```
100    int main_result1, main_result2, main_result3;
101    int i_0, k_0, sum_k_0=0;
102    int i_1, k_1, sum_k_1=0;
103    int thread=THREAD_0;
104    int state_0=STATE_0_0;
105    int state_1=STATE_1_0;
106
107    while(!(state_0==FINISHED && state_1==FINISHED)) {
108      switch (thread) {
109      case THREAD_0:
110        switch (state_0) {
111        case STATE_0_0:
112          i_0=1;
113          state_0=STATE_0_1;
114          break;
115
116        case STATE_0_1:
117          k_0=i_0*2;
118          sum_k_0=sum_k_0+k_0;
119          i_0=i_0+1;
120          if (!(i_0<=10))
121            state_0=STATE_0_2;
122          break;
123
124        case STATE_0_2:
125          main_result1=sum_k_0;
126          state_0=FINISHED;
127        }
128        thread=THREAD_1;
129        break;
```

Fig.6

```
130
131   case THREAD_1:
132     switch (state_1) {
133     case STATE_1_0:
134       i_1=1;
135       state_1=STATE_1_1;
136       break;
137
138     case STATE_1_1:
139       k_1=i_1*i_1;
140       sum_k_1=sum_k_1+k_1;
141       i_1=i_1+1;
142       if (!(i_1<=10))
143         state_1=STATE_1_2;
144       break;
145
146     case STATE_1_2:
147       main_result2=sum_k_1;
148       state_1=FINISHED;
149     }
150     thread=THREAD_0;
151     break;
152   }
153 }
154
155 main_result3=main_result1+main_result2;
```

52

DEBUG DEVICE, DEBUG METHOD AND STORAGE MEDIUM

This application claims priority of JP Application No. 2002-356975 filed 09 Dec. 2002, the entire contents of which is incorporated herein by reference.

BACKGROUND OF THE INVENTION

The present invention relates to a debug device and a debug method for converting a parallel program to a serial program and executing debugging. The present invention also relates to a storage medium for storing a program that implements such debug method.

Herein, programs written in parallel programming languages are referred to as parallel programs.

Also, programs written in the programming languages for describing serial processing are referred to as serial programs.

Further, debugging signifies identifying and correcting bugs of a program.

Parallel programming languages are generally used for describing the processing to execute some tasks concurrently in parallel. For example, for design of a Large-Scale Integrated (LSI) circuit, a parallel programming language is used as a programming language rather than a serial processing because the internal operation of the LSI is basically parallel. Essentially, in order to verify the operation of the LSI designed by the parallel programming language, it is preferable to run the parallel program describing the LSI operation on a computer.

However, most computers used by LSI designers for LSI designing are built for executing serial programs. With use of such computers that execute the serial programs, it is not possible to directly execute parallel programs.

Accordingly, as shown in FIG. 1, widely adopted is a method in which a parallel program 1 is automatically converted to a serial program 4 by a serialization unit 2 and the obtained serial program 4 is executed on the computer. If a bug (failure) is found out in the original parallel program 1 as a result of executing the serial program 4, a designer runs the serial program 4 on a debugger 6 to specify the location of the bug, and then corrects the corresponding location in the original parallel program 1.

When the parallel program 1 is automatically converted to the serial program 4 by the serialization unit 2, a singularity of line in the parallel program 1 is sometimes converted to a plurality of lines of processing in the serial program 4. Also, a variable identifier in the parallel program 1 is sometimes converted to a different variable identifier in the serial program 4.

In the aforementioned method, when the parallel program 1 is converted to the serial program 4, no information is left as for which line in the serial program 4 a certain line in the parallel program 1 is converted to, or which variable identifier in the serial program 4 a certain variable identifier in the parallel program 1 is converted to.

Consequently, an operator who performs debugging needs to proceed with the operation while obtaining the correspondence between the lines in the parallel program 1 and the lines in serial program 4 by him/herself. Further, the operator also needs to proceed with the operation while obtaining the correspondence between the variable identifiers in the parallel program and the variable identifiers in the serial program by him/herself. As a result, the operation of converting the parallel program to the serial program and executing debugging suffers considerable deterioration of efficiency and takes long time.

Further, as shown in FIG. 2, there is known a method in which a parallel program 1 is once converted to a serial program 4 for correction. Specifically, if a bug is found in the serial program 4, not the original parallel program 1 but the serial program 4 is corrected. Then, the corrected serial program is converted to a parallel program 10 by a parallelization unit 9 (see Japanese Patent Laid-Open Publication HEI 8-16429 as an example). Still in this method, however, an operator needs to debug the serial program 4 containing lines and variable identifiers different from those in the parallel program 1. This deteriorates the efficiency of the debug operation. Furthermore, according to this method, the serial program 4 is converted to the parallel program 10 after being debugged, so that the configuration of the obtained parallel program 10 is possibly changed contrary to the intention of a creator of the original parallel program 1. As a result, the program becomes less concise, and the working efficiency is reduced in later use or change of the parallel program 10.

SUMMARY OF THE INVENTION

An object of the present invention is therefore to provide a debug device for use in converting a parallel program to a serial program and executing debugging, which allows an operator to efficiently perform a debug operation. Another object of the present invention is to provide a debug method for use in converting a parallel program to a serial program and executing debugging, which enables an operator to efficiently perform a debug operation.

Still another object of the present invention is to provide a storage medium for storing a program that implements such debug method.

In order to accomplish the above objects, the present invention provides a debug device for use in converting a parallel program to a serial program and executing debugging, comprising:

serialization means for converting a parallel program to a serial program and creating debug data that indicates a corresponding relation between the parallel program and the serial program; and storage means for storing the debug data.

In the debug device of the present invention, the serialization means converts a parallel program to a serial program and creates debug data that indicates a corresponding relation between the parallel program and the serial program. Then, the storage means stores the debug data. Therefore, an operator who performs debugging can easily obtain the correspondence between the parallel program and the serial program based on the stored contents of the storage means, i.e., the debug data. This enables the operator to perform the debug operation efficiently in a short period of time.

Another aspect of the present invention provides a debug device for use in converting a parallel program to a serial program and executing debugging, comprising:

storage means for storing debag data that indicates a corresponding relation between the parallel program and the serial program; and conversion means for mutually converting corresponding data between the parallel program and the serial program based on the debug data.

In the debug device of the present invention, the storage means stores the debug data indicating the corresponding relation between the parallel program and the serial program that are targets of debugging. The conversion means converts the data of the parallel program and the serial program that correspond to each other based on the debug data. Therefore, an operator who performs debugging does not have to convert the data of the parallel program and the serial program that correspond to each other by him/herself. This enables the operator to perform the debug operation efficiently in a short period of time.

Still another aspect of the present invention provides a debug device for use in converting a parallel program to a serial program and executing debugging, comprising:

serialization means for converting the parallel program to the serial program and creating debug data that indicates a corresponding relation between the parallel program and the serial program;

storage means for storing the debug data; and conversion means for mutually converting corresponding data between the parallel program and the serial program based on the debug data.

In the debug device of the present invention, the serialization means converts a parallel program to a serial program and creates debug data that indicates a corresponding relation between the parallel program and the serial program. Then, the storage means stores the debug data. The conversion means converts the data of the parallel program and the serial program that correspond to each other based on the debug data. Therefore, an operator who performs debugging does not have to convert the data of the parallel program and the serial program that correspond to each other by him/herself. This enables the operator to perform the debug operation efficiently in a short period of time.

It is preferable to display the data of the parallel program while hiding the data of the serial program corresponding thereto. In such a case, an operator can perform the debug operation with a sense as if to directly debug the parallel program through the conversion means. For example, the operator can identify the location of a bug with use of a line number and a variable identifier in the original parallel program. Then, the operator can correct and eliminate the bug with use of the line number and the variable identifier in the original parallel program.

In one embodiment of the present invention, the debug data indicates a line number correspondence between the parallel program and the serial program.

In the debug device of this one embodiment, the debug data indicates the line number correspondence between the parallel program and the serial program. Therefore, an operator who performs debugging can easily obtain the line number correspondence between the parallel program and the serial program based on the debug data. This enables the operator to perform the debug operation efficiently in a short period of time. Particularly in the case where the conversion means converts the line numbers of the parallel program and the serial program that correspond to each other based on the debug data, the operator can perform the debug operation further more efficiently in a short period of time.

In one embodiment of the invention, the debug data indicates a variable identifier correspondence between the parallel program and the serial program.

In the debug device of this embodiment, since the debug data indicates the variable identifier correspondence between the parallel program and the serial program, an operator who performs debugging can easily obtain the variable identifier correspondence between the parallel program and the serial program based on the debug data. This enables the operator to perform the debug operation efficiently in a short period of time. Particularly in the case where the conversion means converts the variable identifiers of the parallel program and the serial program that correspond to each other based on the debug data, the operator can perform the debug operation further more efficiently in a short period of time.

In one embodiment of the invention, the debug data indicates a line number correspondence and a variable identifier correspondence between the parallel program and the serial program In the debug device of this embodiment, since the debug data indicates the line number correspondence and the variable identifier correspondence between the parallel program and the serial program, an operator who performs debugging can easily obtain the line number correspondence and the variable identifier correspondence between the parallel program and the serial program based on the debug data. This enables the operator to perform the debug operation efficiently in a short period of time. Particularly in the case where the conversion means converts the line numbers and the variable identifiers of the parallel program and the serial program that correspond to each other based on the debug data, the operator can perform the debug operation further more efficiently in a short period of time.

The invention also provides a debug method for converting a parallel program to a serial program and executing debugging, comprising:

converting the parallel program to the serial program by serialization means;

creating debug data indicating a corresponding relation between the parallel program and the serial program; and storing the debug data in storage means.

In the debug method of the present invention, a parallel program is converted to a serial program by a serialization means. At the same time, debug data indicating the corresponding relation between the parallel program and the serial program is created. Then, the debug data is stored in the storage means. Therefore, an operator who performs debugging can easily obtain the correspondence between the parallel program and the serial program based on the stored contents of the storage means, i.e., the debug data. This enables the operator to perform the debug operation efficiently in a short period of time.

Another aspect of the present invention provides a debug method for converting a parallel program to a serial program and executing debugging, comprising:

storing debug data indicating a corresponding relation between the parallel program and the serial program in storage means; and converting data of the parallel program and the serial program that correspond to each other based on the debug data by conversion means.

In the debug method of the present invention, the debug data indicating the corresponding relation between a parallel program and a serial program that are targets of debugging is stored in the storage means. Then, based on the debug data, the data of the parallel program and the serial program that correspond to each other are converted by the conversion means. Therefore, an operator who performs debugging does not have to convert the data of the parallel program and the serial program that correspond to each other by him/herself. This enables the operator to perform the debug operation efficiently in a short period of time.

Still another aspect of this invention provides a debug method for converting a parallel program to a serial program and executing debugging, comprising:

converting the parallel program to the serial program by serialization means;

creating debug data indicating a corresponding relation between the parallel program and the serial program;

storing the debug data in storage means; and converting data of the parallel program and the serial program that correspond to each other based on the debug data by conversion means.

In the debug method of the present invention, a parallel program is converted to a serial program by the serialization means. At the same time, the debug data indicating the corresponding relation between the parallel program and the serial program is created. Then, the debug data is stored in the storage means. Based on the debug data, data of the parallel program and the serial program that correspond to each other are converted by the conversion means. Therefore, an operator who performs debugging does not have to convert the data of the parallel program and the serial program that correspond to each other by him/herself. This enables the operator to perform the debug operation efficiently in a short period of time.

The present invention provides a computer-readable storage medium that stores a program for implementing the above debug method.

If a program stored in the storage medium of the present invention is read by computer and executed, then the above-described debug method can be implemented. Therefore, an operator can perform the debug operation efficiently in a short period of time.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a view showing a serial program (former portion) obtained by converting the parallel program of FIG. 4;

FIG. 6 is a view showing a serial program (latter portion) obtained by converting the parallel program of FIG. 4;

DETAILED DESCRIPTION OF THE PREFERRED EMBODIMENTS

The present invention will be described in detail below on the basis of illustrated embodiments.

Figure 1:
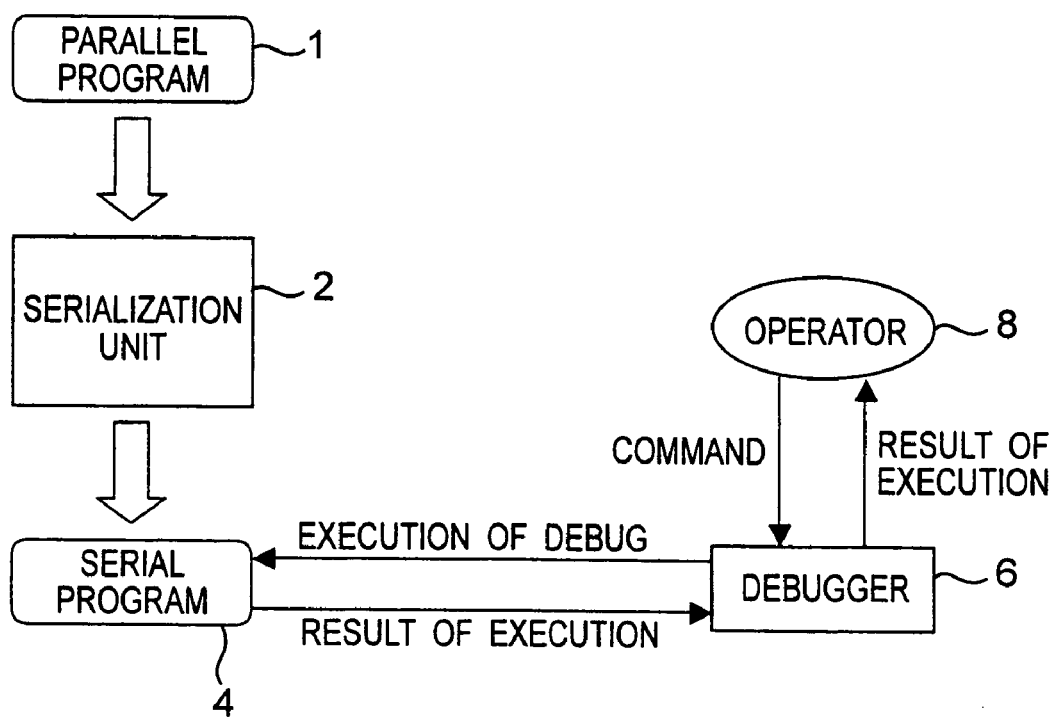
FIG. 1 is an explanatory view showing a conventional method for converting a parallel program to a serial program and executing debugging.
Figure 2:
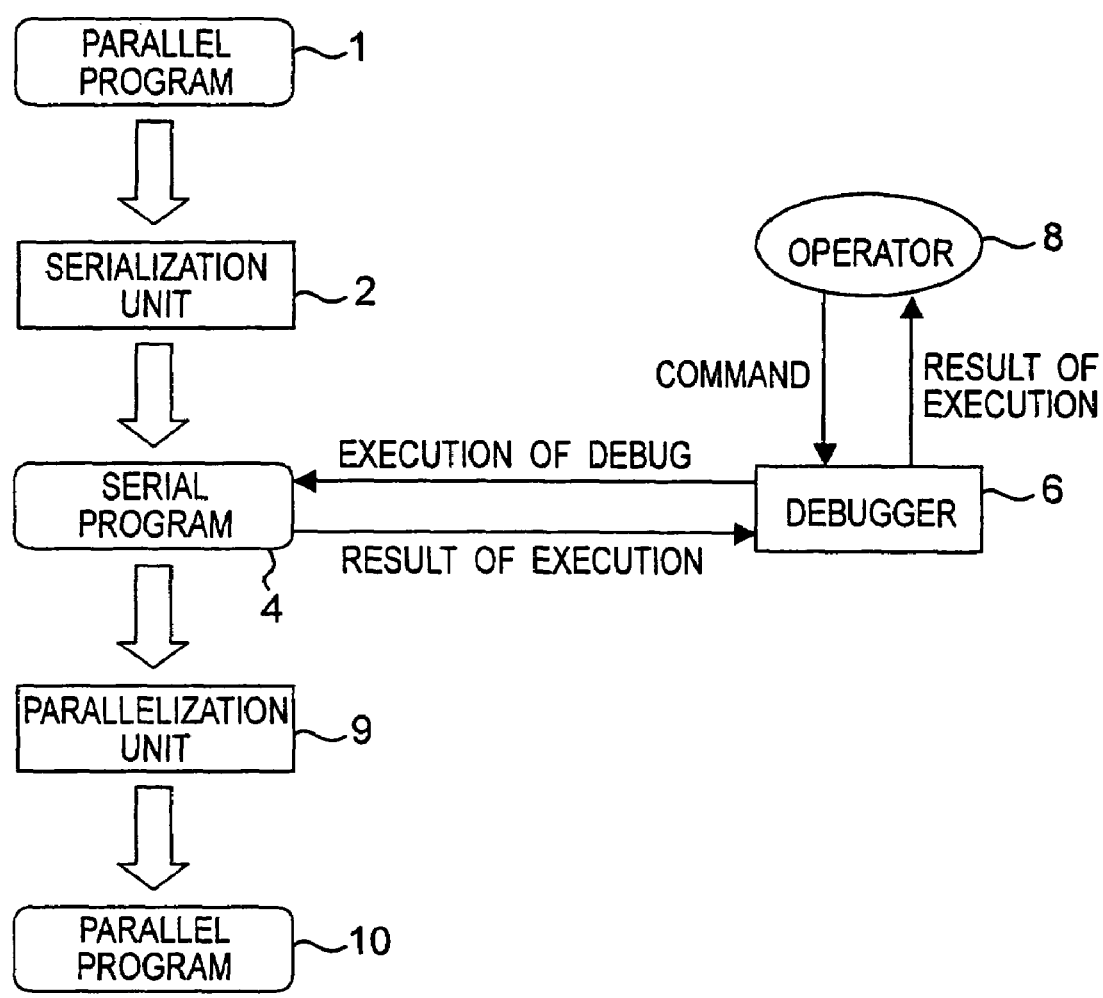
FIG. 2 is an explanatory view showing a conventional method for correcting not an original parallel program but a serial program and converting the corrected serial program to a parallel program.
Figure 3:
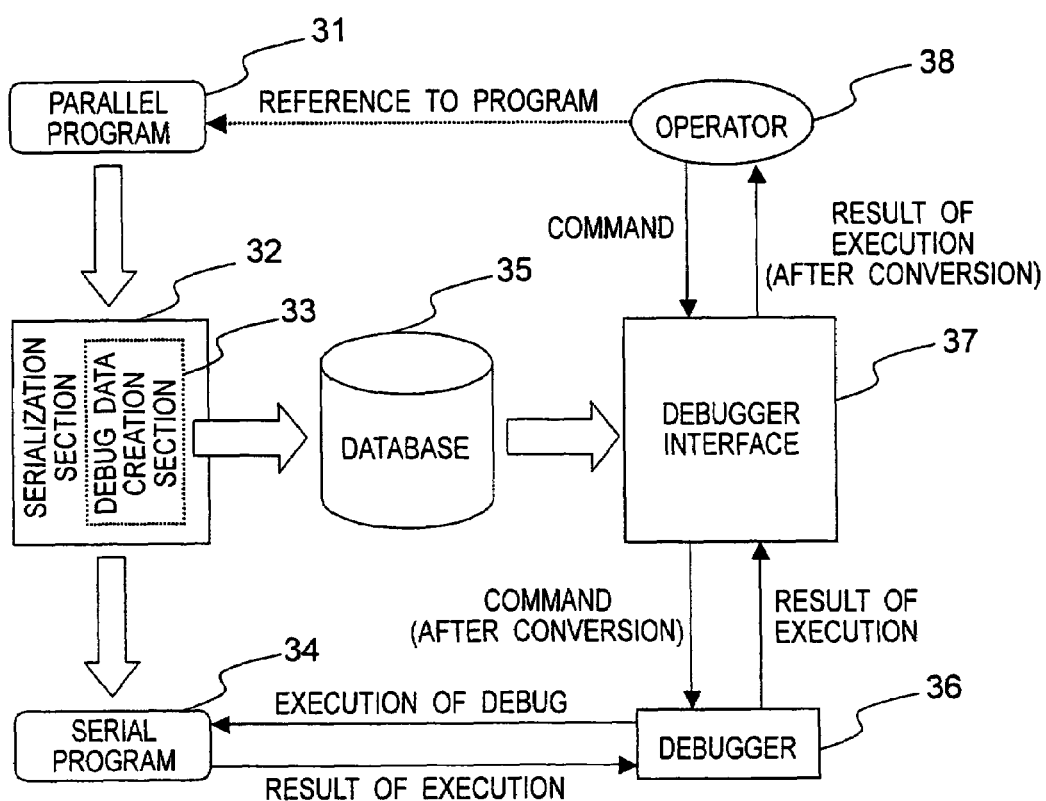
FIG. 3 is a view showing the configuration of a debug device in one embodiment of the present invention.

FIG. 3 shows a configuration of a debug device in one embodiment of the present invention.

The debug device has a serialization section 32 as a serialization means, a database 35 as a storage means, a debugger 36 as a tool for debugging the serial program and a debugger interface 37 as a conversion means so as to convert a parallel program 31 to a serial program 34 and thereafter to execute debugging.

The serialization section 32 executes a serialization processing to convert the parallel program 31 to the serial program 34. It is to be noted that a known method may be adopted for the serialization processing.

Inside the serialization section 32, a debug data creation section 33 is included. The debug data creation section 33 creates debug data indicating the corresponding relation between the parallel program 31 and the serial program 34 concurrently with execution of the serialization processing. The debug data is stored in the database 35.

The debugger 36 receives a command inputted by an operator through the debugger interface 37, and debugs the serial program 34 in response to the received command.

The debugger interface 37 receives a command from a debug operator 38, and issues a command converted as needed with reference to the database 35 to the debugger 36. The debugger interface 37 also receives an output from the debugger 36, and outputs an output converted as needed with reference to the database 35 to the debug operator 38.

It is to be noted that the debug device also has a display unit that displays the program subjected to debugging, and an output unit that supplies an output of the debug operation to the operator in addition to the above-stated components.

Next, description will be given of the debug processing executed by the above-configured debug device.

Figure 4:
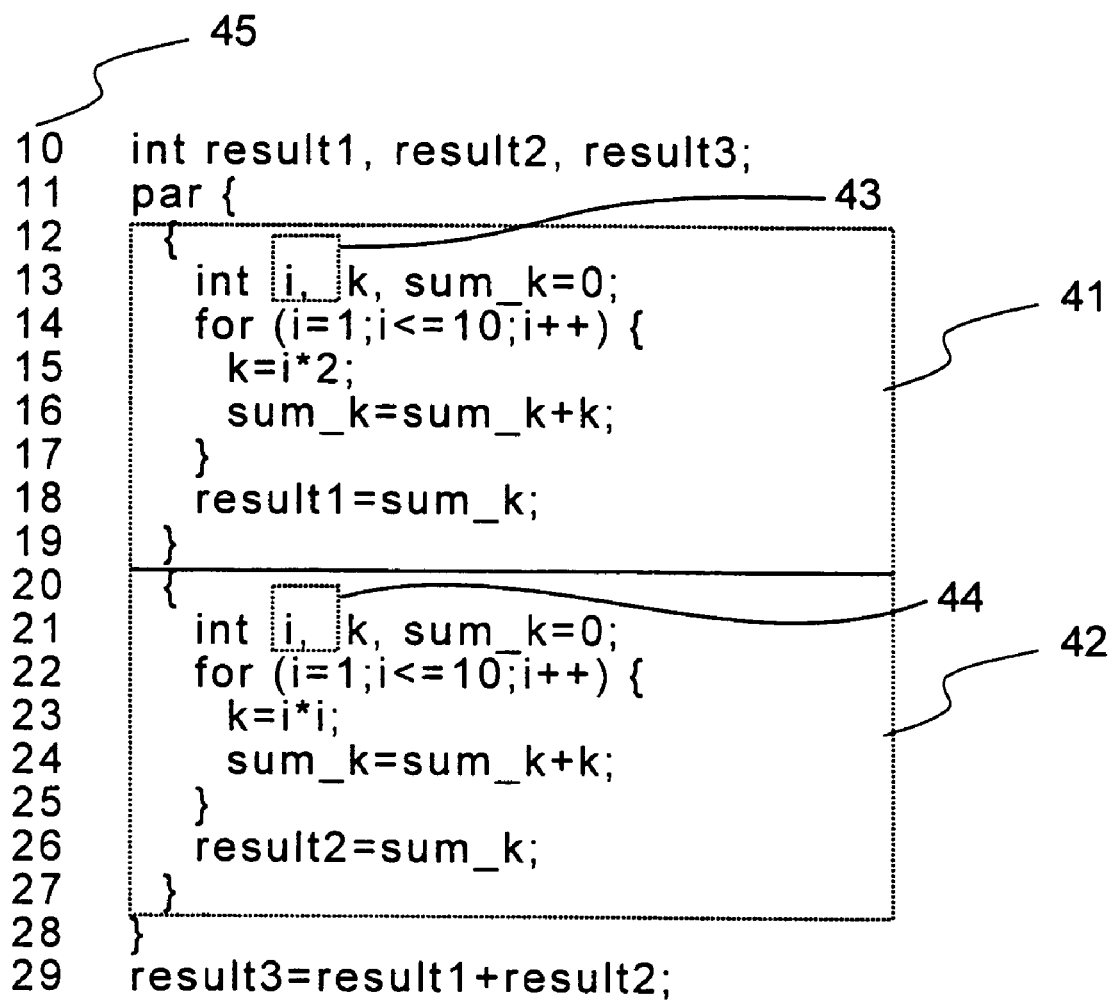
FIG. 4 is a view showing an example of the parallel program.

(I) First, a program having contents as shown in FIG. 4 is inputted in the serialization section 32 as a parallel program 31.

Herein, the line numbers (10, 11, . . . , 29) 45 shown in the left column in FIG. 4 are added for explanation, and therefore not included in the parallel program 31.

The parallel program 31 has the grammar of extended C language, and the processings executed in parallel are described in the range enclosed within braces { } placed after a key word "par". In this example, the processings 41, 42 enclosed with fine dotted lines are independently executed in parallel. Since these processings 41, 42 are independent from each other, each of them may include variables of the same names such as variable i and variable k. For easier understanding, variable i included in the processing 41 is given a numeral 43, while variable i included in the processing 42 is given a numeral 44.

(II) The serialization section 32 serializes the parallel program 31 with use of C language to output a program having contents as shown in FIG. 5 to FIG. 6 as a serial program 34.

It is to be noted that FIGS. 5 and 6 represent former and latter portions, respectively. The line numbers (100, 101, . . . , 155) 55 shown in the left column in FIGS. 5 and 6 are added for explanation, and not included in the parallel program 34.

In the serial program 34, the processings 51, 52 enclosed with fine dotted lines correspond to the processings 41, 42 in FIG. 4 respectively, and operate serially. Variable i_0

(shown by numeral 53) and variable i_1 (shown by numeral 54) in the serial program 34 correspond to variable i (shown by numeral 43) in the processing 41 and variable i (shown by numeral 44) in the processing 42, respectively, in the parallel program 31. In this way, the variables are distinguished from each other by adding scope numbers such as "_0" and "_1" to the same variable identifiers included in the processings 41 and 42, respectively. This is because the same variable identifier is treated as indicating the same entity in the serial program (more specifically, one processing block of the serial program), where it is not allowed that the same variable identifiers having different entities exist.

The processings 51, 52 included in the serial program 34 are executed in pseudo-parallel based on the processings other than the portion enclosed within the fine dotted lines in FIG. 5.

(III) The serialization section 32 converts the parallel program 31 to the serial program 34, while at the same time the debug data creation section 33 inside the serialization section 32 creates debug data indicating the corresponding relation between the parallel program 31 and the serial program 34. The created debug data is stored in the database 35.

Figure 7:
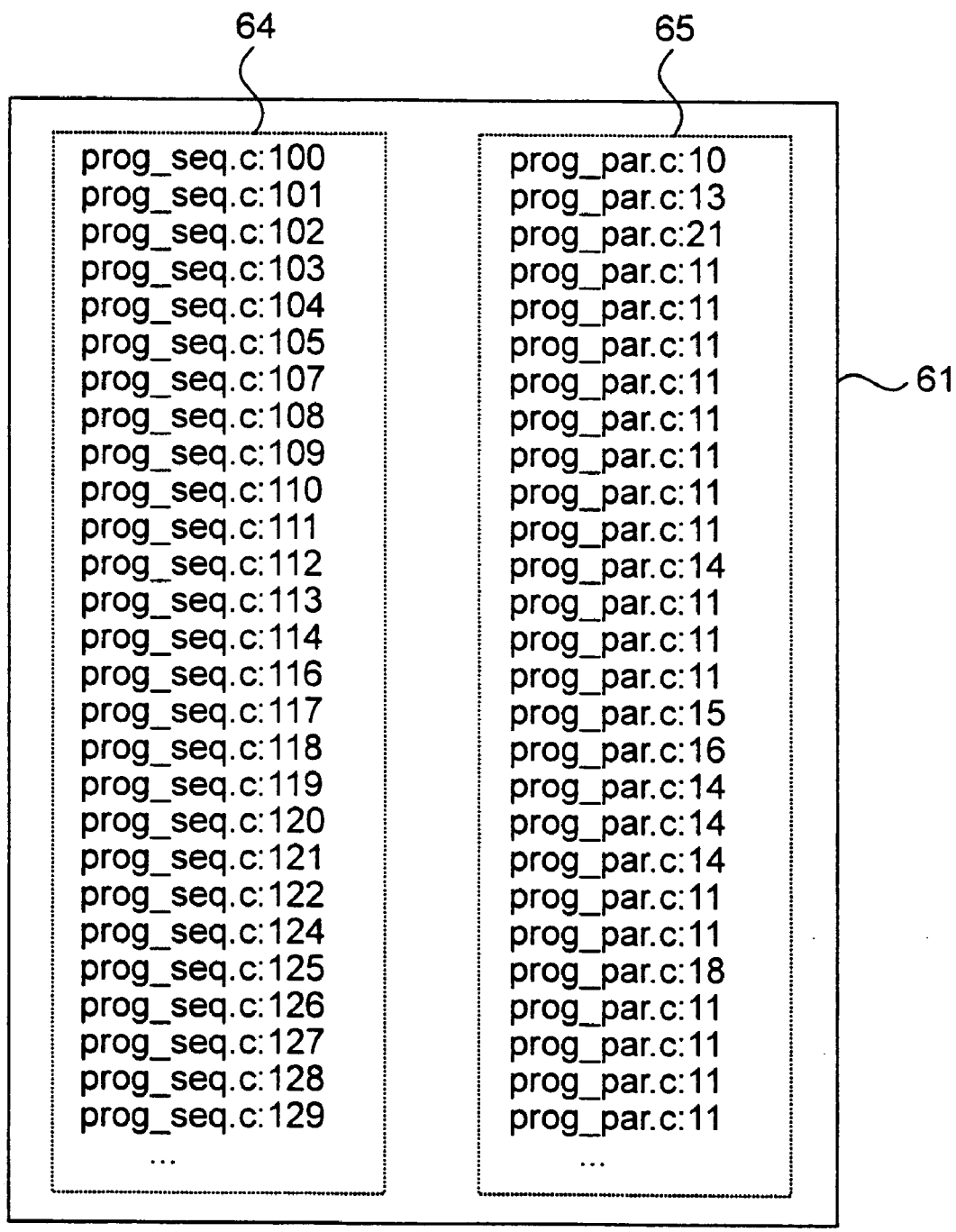
FIG. 7 is a view showing line number corresponding data as debug data stored in a database.
Figure 8:
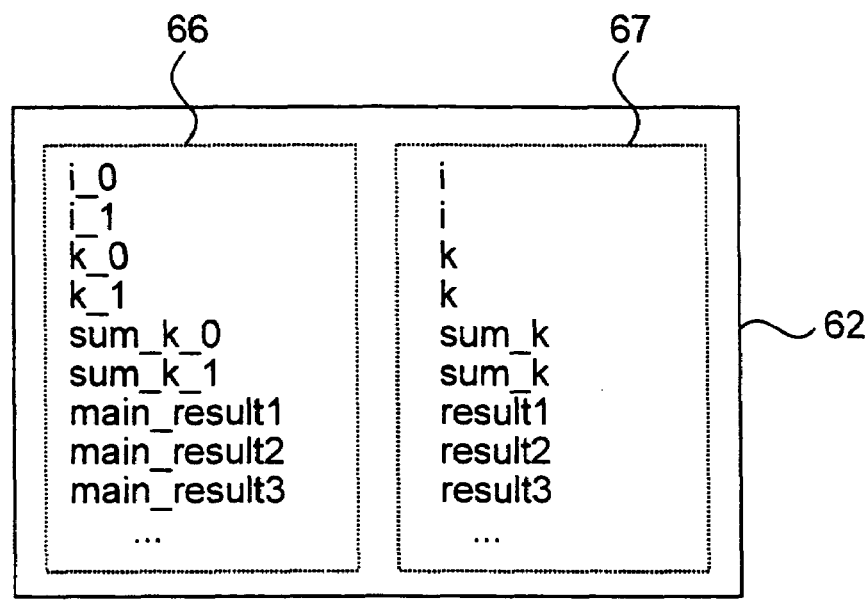
FIG. 8 is a view illustrating variable identifier corresponding data as debug data stored in a database.
Figure 9:
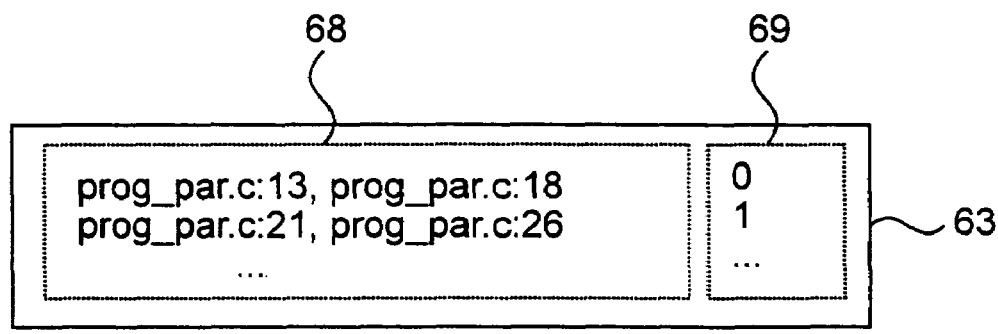
FIG. 9 is a view illustrating scope data as debug data stored in a database.

In this example, the debug data includes line number corresponding data 61 shown in FIG. 7, variable identifier corresponding data 62 shown in FIG. 8 and a scope data 63 shown in FIG. 9.

The line number corresponding data 61 shown in FIG. 7 indicates the corresponding relation between line numbers (shown in a row in the right column) for executing a given processing in the parallel program 31 and line numbers (shown in a row in the left column) for executing the same processing in the serial program 34. It is indicated in FIG. 7 that the 15th line of a parallel program ("prog_par.c") corresponds to the 117th line of a serial program ("prog_seq.c"), for example. The line number corresponding data 61 is created by the debug data creation section 33 in relationship between the line numbers of original lines in the parallel program 31 and the line numbers in the converted serial program 34 when the serialization section 32 converts the lines of the parallel program 31 to the lines of the serial program 34, and registered in the database 35.

The variable identifier corresponding data 62 shown in FIG. 8 indicates the corresponding relation between variable identifiers (shown in a row in the right column 67) addressing certain data in the parallel program 31 and the variable identifiers (shown in a row in the left column 66) addressing the same data in the serial program 34. It is indicated in FIG. 8 that variable i in the parallel program 31 corresponds to variable i_0 and the variable i_1 in the serial program 34, for example. Further, variable k in the parallel program 31 corresponds to variable k_0 and variable k_1 in the serial program 34. The variable identifier corresponding data 62 is created by the debug data creation section 33 in relationship between the variable identifiers in the parallel program 31 and the variable identifiers in the serial program 34 when the serialization section 32 converts the variable identifiers in the parallel program 31 to the variable identifiers in the serial program 34, and registered in the database 35.

The scope data 63 shown in FIG. 9 indicates the corresponding relation between the scopes of variables in the parallel program 31 (specified by two line numbers of the first line and the last line and shown in a row in the left column 68) and scope numbers (shown in a row in the right column 69). The scope numbers are numbers introduced upon execution of the serialization processing in order to distinguish the effective scopes of variables in the parallel program 31 from each other. For example, it is indicated in FIG. 9 that the scope of the 13th line to the 18th line of a parallel program ("prog_par.c") corresponds to the scope number "0". Also, it is indicated that the scope of the 21st line to the 26th line of the parallel program ("prog_par.c") corresponds to the scope number "1". The scope data 63 is created by the debug data creation section 33 in relationship between the scopes (two line numbers) of variables in the parallel program 31 and the scope numbers corresponding thereto when the serialization section 32 analyzes the configuration of the parallel program 31, and registered in the database 35.

(IV) After storing the above-described debug data in the database 35, an operator operates the debugger 36 through the debugger interface 37 to debug the debug data.

Figure 10:
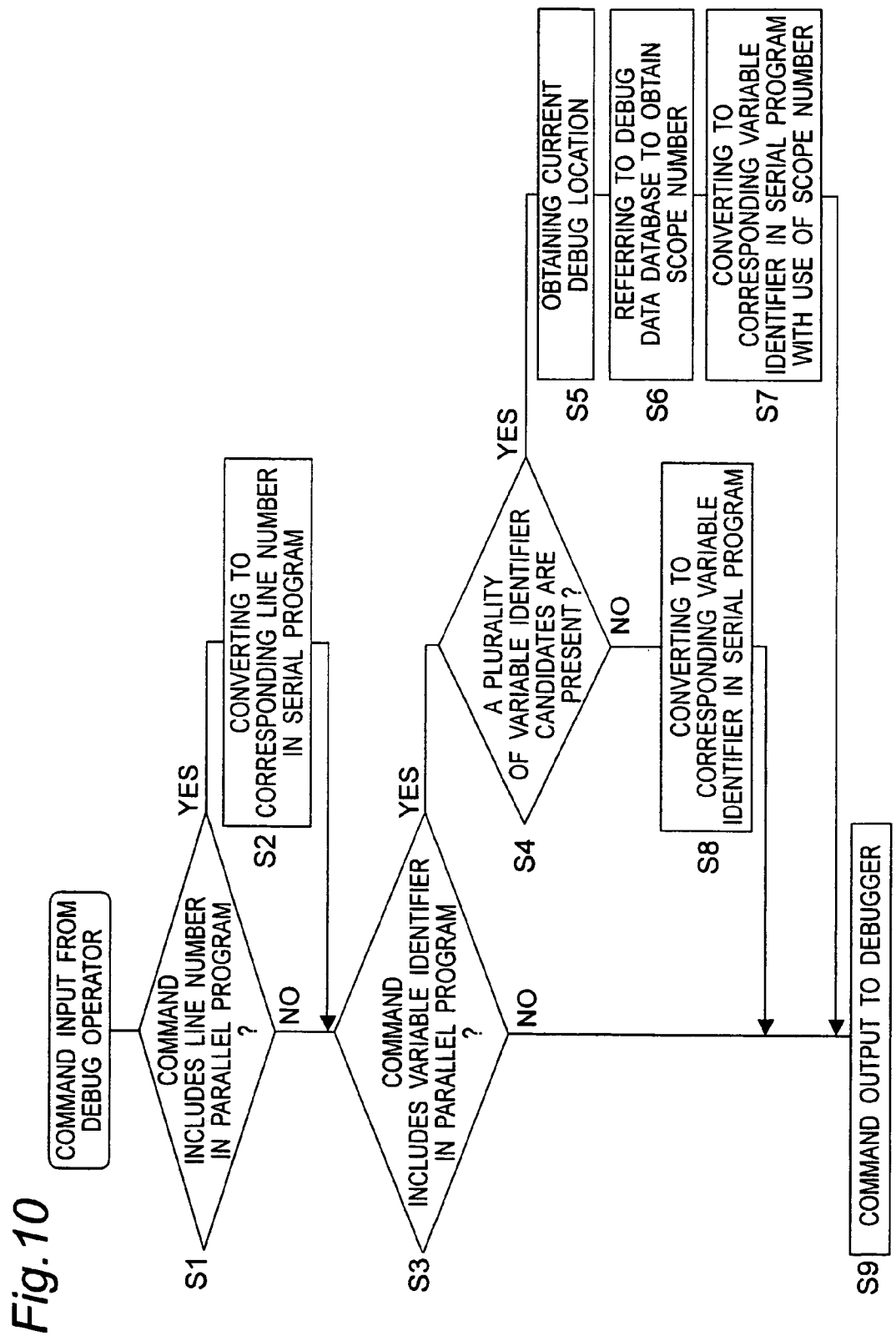
FIG. 10 is a flow chart showing the processing for executing debugging (when a command is issued)

FIG. 10 shows a flow of processing upon issuance of a debug command by a debug operator.

First, an operator 38 issues a command for debugging to the debugger interface 37.

The debugger interface 37 refers to the line number corresponding data 61 (shown in FIG. 7) to check whether or not the command includes a line number in the parallel program 31 (step S1).

If the command includes the line number in the parallel program 31, then the procedure proceeds to step S2. Otherwise, the procedure proceeds to step S3.

In the step S2, based on the result of reference to the line number corresponding data 61 in the database 35, the line number in the parallel program 31 is converted to the corresponding line number in the serial program 34. Then, the procedure proceeds to step S3.

In the step S3, it is checked whether or not the command includes a variable identifier in the parallel program 31 by referring to the variable identifier corresponding data 62 (shown in FIG. 8) in the database 35.

If the command includes the variable identifier in the parallel program 31, then the procedure proceeds to step S4. Otherwise, the procedure proceeds to step S9.

In the step S4, based on the result of reference to the variable identifier corresponding data 62 in the database 35, it is checked whether or not the variable identifier in the parallel program 31 corresponds to a plurality of variable identifiers in the serial program 34.

If the variable identifier in the parallel program 31 corresponds to a plurality of the variable identifiers in the serial program 34, then the procedure proceeds to step S5 to S7. If it does not correspond to a plurality of variable identifiers, i.e., if it corresponds to only one variable identifier, then the procedure proceeds to step S8.

In the step S5 to S7, where the variable identifier in the parallel program 31 corresponds to a plurality of variable identifiers in the serial program 34, the scope number is used to distinguish each of a plurality of variable identifiers. More specifically, first, in the step S5, the location on the program where debugging is currently performed (this is referred to as "debug location") is specified. Next in the step S6, the scope data 63 in the database 35 (shown in FIG. 9) is referred to obtain a scope number corresponding to the scope including the current debug location obtained in the step S5. Next in the step S7, with use of the scope number obtained in the step S6, a variable identifier in the parallel program 31 is converted to corresponding variable identifiers in the serial program 34. For example, if the scope number obtained in the step S6 is "0", then variable i in the parallel program 31 is converted to variable i_0 in the serial program 34. If the scope number obtained in the step S6 is "1", then variable i in the parallel program 31 is converted to variable i_1. Then the procedure proceeds to step S9.

In the step S8, where a variable identifier in the parallel program 31 corresponds to only one variable identifier in the serial program 34, it is not necessary to use the scope number. Consequently, based on the result of reference to the variable identifier corresponding data 62 in the database 35, the variable identifier in the parallel program 31 is simply converted to the corresponding variable identifier in the serial program 34. Then the procedure proceeds to step S9.

In the step S9, the command converted through the processing in the aforementioned steps S1 to S8 is issued to the debugger 36. However, if the command includes neither a line number nor a variable identifier (NO in both the step S1 and S3), then the command is not converted and is issued as-is.

Figure 11:
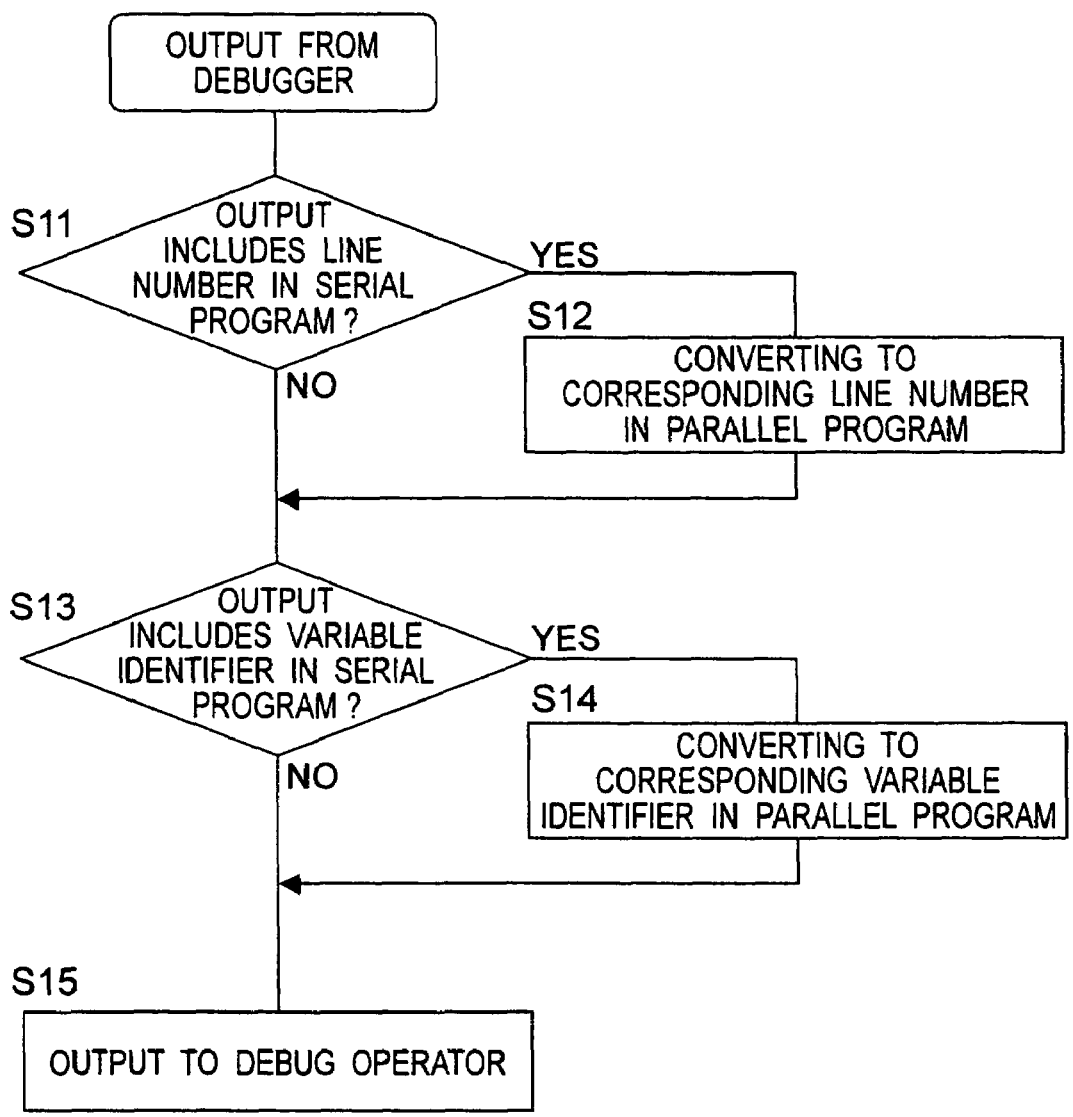
FIG. 11 is a flow chart showing the processing for executing debugging (when a result is outputted).

FIG. 11 shows a flow of processing of an output from the debugger 36.

Upon reception of an output from the debugger 36, first, the debugger interface 37 refers to the line number corresponding data 61 in the database 35 (shown in FIG. 7) to check whether or not the output includes a line number in the serial program 34 (step S11).

If the output includes the line number in the serial program 34, then the procedure proceeds to step S12. Otherwise, the step proceeds to step S13.

In the step S12, based on the result of reference to the line number corresponding data 61 in the database 35, the line number in the serial program 34 is converted to the corresponding line number in the parallel program 31. Then, the procedure proceeds to step S13.

In the step S13, it is checked whether or not the output includes a variable identifier in the serial program 34 by referring to the variable identifier corresponding data 62 in the database 35 (shown in FIG. 8).

If the output includes the variable identifier in the serial program 34, then the procedure proceeds to step S14. Otherwise, the procedure proceeds to step S15.

In the step S14, based on the result of reference to the variable identifier corresponding data 62 in the database 35, the variable identifier in the serial program 34 is converted to the corresponding variable identifier in the parallel program 31. Then, the procedure proceeds to step S15.

In the step S15, an output converted through the processing in the above-stated step S11 to S14 is supplied to the operator. However, if the output includes neither a line number nor a variable (NO in both the step S11 and S13), the output is not converted and is supplied as-is.

When debugging is executed as described above, the operator does not have to convert the line numbers and the variable identifiers that correspond to each other between the parallel program 31 and the serial program 34 by him/herself.

Moreover, in the case where the data of the parallel program 31 is displayed by a display unit while the data of the serial program 34 corresponding thereto is hidden, an operator can perform the debug operation with a sense as if to directly debug the parallel program 31 through the debugger interface 37. For example, the operator can identify the location of a bug with use of a line number and a variable identifier in the original parallel program 31. Then, the operator can correct and eliminate the bug with use of the line number and the variable identifier in the original parallel program 31.

This enables the operator to perform the debug operation efficiently in a short period of time.

It is to be noted that the debug device may be configured with use of a program (software) for executing the processing of the aforementioned debugging that is run on a general computer capable of executing serial programs. The program may be stored in an external storage unit (fixed storage unit) included in the computer. Alternatively, the program that is written onto a storage medium (such as compact disks) may be read by a readable drive.

As is clear from the above description, the debug device and the debug method according to the present invention allow an operator to efficiently perform the debug operation.

Further, the storage medium according to the present invention allows the above-stated debug method to be implemented.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

What is claimed is:

1. A debug device for use in converting a parallel program to a serial program and executing debugging, comprising:
   a serialization unit for converting the parallel program to the serial program and creating debug data that indicates a corresponding relation between the parallel program and the serial program; and
   a storage device for storing the debug data, wherein
   the debug data indicates a line number correspondence between the parallel program and the serial program.

2. The debug device as claimed in claim 1, wherein
   the debug data further indicates a variable identifier correspondence between the parallel program and the serial program.

3. A debug device for use in converting a parallel program to a serial program and executing debugging, comprising:
   a serialization unit for converting the parallel program to the serial program and creating debug data that indicates a corresponding relation between the parallel program and the serial program; and
   a storage device for storing the debug data, wherein
   the debug data indicates a variable identifier correspondence between the parallel program and the serial program.

4. The debug device as claimed in claim 3, wherein
   the debug data further indicates a line number correspondence between the parallel program and the serial program.

5. A debug device for use in converting a parallel program to a serial program and executing debugging, comprising:
   a storage device for storing debug data that indicates a corresponding relation between the parallel program and the serial program; and
   a conversion unit for mutually converting corresponding data between the parallel program and the serial program based on the debug data, wherein
   the debug data indicates a line number correspondence between the parallel program and the serial program.

6. The debug device as claimed in claim 5, wherein
   the debug data further indicates a variable identifier correspondence between the parallel program and the serial program.

7. A debug device for use in converting a parallel program to a serial program and executing debugging, comprising:
   a storage device for storing debug data that indicates a corresponding relation between the parallel program and the serial program; and a conversion unit for mutually converting corresponding data between the parallel program and the serial program based on the debug data, wherein
the debug data indicates a variable identifier correspondence between the parallel program and the serial program.

8. The debug device as claimed in claim 7, wherein the debug data further indicates a line number correspondence between the parallel program and the serial program.

9. A debug device for use in converting a parallel program to a serial program and executing debugging, comprising:
a serialization unit for converting the parallel program to the serial program and creating debug data that indicates a corresponding relation between the parallel program and the serial program;
a storage device for storing the debug data; and
a conversion unit for mutually converting corresponding data between the parallel program and the serial program based on the debug data, wherein
the debug data indicates a line number correspondence between the parallel program and the serial program.

10. The debug device as claimed in claim 9, wherein the debug data further indicates a variable identifier correspondence between the parallel program and the serial program.

11. A debug device for use in converting a parallel program to a serial program and executing debugging, comprising:
a serialization unit for converting the parallel program to the serial program and creating debug data that indicates a corresponding relation between the parallel program and the serial program;
a storage device for storing the debug data; and
a conversion unit for mutually converting corresponding data between the parallel program and the serial program based on the debug data, wherein
the debug data indicates a variable identifier correspondence between the parallel program and the serial program.

12. The debug device as claimed in claim 11, wherein the debug data further indicates a line number correspondence between the parallel program and the serial program.

13. A debug method for converting a parallel program to a serial program and executing debugging, comprising:
converting the parallel program to the serial program by serialization;
creating debug data indicating a corresponding relation between the parallel program and the serial program; and
storing the debug data,
wherein the debug data indicates a line number correspondence between the parallel program and the serial program.

14. A debug method for converting a parallel program to a serial program and executing debugging, comprising:
storing debug data indicating a corresponding relation between the parallel program and the serial program in a storage device; and
converting data of the parallel program and the serial program that correspond to each other based on the debug data by a conversion unit.

15. A debug method for converting a parallel program to a serial program and executing debugging, comprising:
converting the parallel program to the serial program by a serialization unit;
creating debug data indicating a corresponding relation between the parallel program and the serial program;
storing the debug data in a storage device; and
converting data of the parallel program and the serial program that correspond to each other based on the debug data by a conversion unit.

16. A computer-readable storage medium that stores a program for implementing the debug method as claimed in claim 13.

17. A computer-readable storage medium that stores a program for implementing the debug method as claimed in claim 14.

18. A computer-readable storage medium that stores a program for implementing the debug method as claimed in claim 15.

19. A debug method for converting a parallel program to a serial program and executing debugging, comprising:
converting the parallel program to the serial program by serialization;
creating debug data indicating a corresponding relation between the parallel program and the serial program; and
storing the debug data,
wherein the debug data indicates a variable identifier correspondence between the parallel program and the serial program.

20. A computer-readable storage medium that stores a program for implementing the debug method as claimed in claim 19.

* * * * *